(12) United States Patent
Wah et al.

(10) Patent No.: US 8,777,608 B2
(45) Date of Patent: Jul. 15, 2014

(54) BURNER IGNITION SYSTEM AND METHOD OF IGNITION

(75) Inventors: Raymond Cheok Liang Wah, Hangzhou (CN); Weijie Pan, Shanghai (CN); Yu Xuejing, Hangzhou (CN); Stephen Wise, Dudley Park (AU)

(73) Assignee: Aktiebolaget Electrolux, Stockholm (SE)

( * ) Notice: Subject to any disclaimer, the term of this patent is extended or adjusted under 35 U.S.C. 154(b) by 1214 days.

(21) Appl. No.: 12/668,459

(22) PCT Filed: Jul. 17, 2008

(86) PCT No.: PCT/AU2008/001038
§ 371 (c)(1),
(2), (4) Date: Jun. 3, 2010

(87) PCT Pub. No.: WO2009/009834
PCT Pub. Date: Jan. 22, 2009

(65) Prior Publication Data
US 2010/0236538 A1   Sep. 23, 2010

(30) Foreign Application Priority Data
Jul. 17, 2007 (CN) .................. 2007 2 0156962 U (51) Int. Cl.
*F24C 3/10* (2006.01)
(52) U.S. Cl.
USPC ............. 431/75; 431/25; 431/69; 126/39 BA (58) Field of Classification Search
USPC ............... 431/25, 69, 75, 74, 46; 126/39 BA
See application file for complete search history.

(56) References Cited

U.S. PATENT DOCUMENTS

| 4,235,586 | A |   | 11/1980 | Hirsch |
| 4,319,873 | A |   | 3/1982 | Michaud et al. |
| 4,887,959 | A | * | 12/1989 | Shellenberger ................. 431/46 |
| 5,415,136 | A | * | 5/1995 | Doherty et al. ........... 123/46 SC |
| 5,655,900 | A |   | 8/1997 | Cacciatore |
| 5,722,823 | A | * | 3/1998 | Hodgkiss ........................ 431/43 |

OTHER PUBLICATIONS

Chinese Office Action for Chinese application No. 200880107244.2, dated Feb. 22, 2011.
International Search Report for PCT/AU2008/001038, dated Oct. 29, 2008, 2 pages.

* cited by examiner

*Primary Examiner* — Avinash Savani
(74) *Attorney, Agent, or Firm* — Pearne & Gordon LLP (57) ABSTRACT

A gas burner ignition system, includes a power circuit (1), igniter (3), a solenoid valve (6); an igniter switch control circuit (2) which is connected between the power circuit (1) and igniter (3); a solenoid valve switch control circuit (5) connected between the power circuit (1) and the solenoid valve (6); the solenoid valve switch control circuit (5) and the igniter switch control circuit (2) are responsive to delay circuit (4), so that the user need only operate the control knob without the need to hold the operating knob until the thermocouple (42) has reached operating temperature.

18 Claims, 5 Drawing Sheets

BURNER IGNITION SYSTEM AND METHOD OF IGNITION

TECHNICAL FIELD

This invention is concerned with the field of gas fuel ignition systems, and will be described in the context of an ignition system mounted on household cooker hob and also a cooker hob on which is mounted such an ignition system.

BACKGROUND

Existing ignition systems of common cooker hobs include an igniter, a thermocouple, and solenoid valve connected with thermocouple. The igniter can ignite the cooker hob with a pulsed high voltage spark produced by igniter and maintain the flame by the thermocouple and solenoid valve. When the user presses and turns on the existing igniter knob on a cooker hob, the knob must be held for a time period until the flame combustion stabilizes before releasing the igniter knob. Premature release of the knob before the thermocouple has reached its operating temperature will cause the solenoid valve to close, shutting off the burner. The thermocouple provides sufficient power to hold the valve open when the thermocouple reaches operating temperature.

EP1739351 is directed to providing a fail-safe thermocouple latched gas supply arrangement which does not require the user to hold the igniter knob in the operated state once it has been operated. The specification discloses a gas ignition system including a capacitor from which an electrical signal is obtained to temporarily supply the safety valve. The capacitor is charged using a switch to temporarily connect the capacitor to the alternating mains voltage and conditioning means are used for converting the electrical signal from the capacitor for application to the safety valve. Charging of the capacitor is achieved simultaneously with the operation of the igniter knob. The capacitor is charged from the mains through a rectifier and regulator circuit. The decay of the capacitor charge through the conditioning circuit and solenoid provides a time delay to hold the solenoid operated gas valve open. This makes the system independent of a subsequent mains power failure.

SUMMARY OF THE INVENTION

This invention provides an ignition system which provides an improved ignition of the gas burner.

According to one embodiment of the invention, there is provided an ignition system, including: a power circuit, an ignition circuit, a solenoid valve connected with the power circuit; an igniter switch connected in series between the power circuit and the igniter, a solenoid valve control circuit connected between the power circuit and the solenoid valve, and a delay circuit connected between the solenoid valve switch control circuit and the igniter switch control circuit.

The system can include a switch (Q3); control means (4) responsive to the initiation event to provide a first control signal to the switch (Q3) to connect the controllable valve arrangement (6) to the power source for a first predetermined time period after the initiation event.

Preferentially, the solenoid valve control circuit includes a transistor and divider resistance which connected in series between the power circuit and the solenoid valve.

Preferentially, the delay circuit includes a first capacitance and resistance connected in parallel between the power circuit and earth.

According to a further embodiment of the invention, there is provided a gas ignition arrangement including a gas burner 40; a gas control system 4, 5, including a controllable valve arrangement 5, 6 responsive to initiation event to deliver gas to the burner; and an ignition source 3; characterized in that the gas control system includes:
control means 4 responsive to the initiation event to provide a first control signal to the controllable valve arrangement 5, 6 to maintain the controllable valve arrangement open for a first predetermined time period after the initiation event.

The gas ignition arrangement can include an ignition source controller 2 responsive to the initiation event to cause the ignition source 3 to ignite gas delivered to the burner.

The ignition source can be responsive to a second control signal to maintain ignition operation for a second predetermined time period.

The gas ignition arrangement can include a combustion detector to detect combustion of the gas in the combustion zone.

The controllable valve arrangement can be responsive to a combustion detection signal to maintain delivery of the gas to the combustion zone, and to shut off delivery of the gas in the absence of the detector signal after the first predetermined time period.

The gas ignition system can include a power source to provide power to the ignition circuit.

The power source can provide power to the delay circuit.

The power source can provide power to the controllable valve.

The controllable valve arrangement can include a solenoid valve and a power switch controlling delivery of power to the solenoid valve.

A solenoid valve delay circuit according to an embodiment of the invention includes: a first comparator having first and second inputs; a delay circuit; and a solenoid valve reference voltage circuit; wherein the delay circuit is connected to the first input of the first comparator; the solenoid valve reference voltage circuit is connected to the second input of the first comparator; the output of the first comparator controlling the solenoid valve switch control circuit.

An ignition control circuit according to an embodiment of the invention includes: the first comparator connected between the delay circuit and the circuit controlled by the igniter switch; the second terminal of the first comparator connected to the igniter reference voltage circuit.

A solenoid valve opening delay circuit according to an embodiment of the invention includes: the first comparator; the solenoid valve reference voltage circuit; the positive and negative poles of the first input terminal of the first comparator being connected into the solenoid valve reference voltage circuit and the delay circuit respectively; the first output terminal of the first comparator being connected to the solenoid valve switch control circuit.

The ignition delay circuit includes: the igniter reference voltage circuit; the positive and negative poles of the second input terminal respectively connect to the igniter reference voltage circuit and the delay circuit; the second output terminal of the first controller being connected to the igniter switch control circuit.

Preferentially, the igniter switch control circuit is includes a relay and a transistor connected between the power circuit and the igniter.

Preferentially, the system is further includes an auto-protection feedback circuit which connects to the power circuit; and a micro switch connected between the power circuit and the delay circuit.

The system can include a switchable power supply, and timer means adapted to switch off power to the solenoid valves after a third predetermined time.

The invention also provides a method of controlling a gas burner having a solenoid controlled gas delivery valve arrangement including a gas valve controller and a gas valve, and an igniter adapted to ignite the gas from the burner, the method being characterized by the steps of:

providing an initiation signal;
initiating a timing process in response to the initiation signal;
opening the gas valve in response to the initiation signal;
maintaining the gas valve open for a first time period by applying an output of the determined by the timing process to the gas valve controller;
initiating an igniter in response to the initiation signal;
maintaining the igniter operation for a second period of time period determined by the timing process.

The method can also include the steps of
producing a combustion detection signal; and
supplying power to the solenoid valve in response to the combustion detection signal.

The invention also provides a cooker hob including a cooker hob ignition system including a power circuit, an igniter, and a solenoid valve, both of which are connected to a power circuit, an igniter switch control circuit connected between the power circuit and the igniter switch, and delay circuit serial connected by the solenoid valve switch control circuit and the igniter switch control circuit.

The present invention can be applied to a cooker hob ignition system which includes power circuit, an igniter and solenoid valve both of which are connected to power circuit, an igniter switch control circuit connected between the power circuit and the igniter switch, and delay circuit serial connected by the solenoid valve switch control circuit and the igniter switch control circuit.

The user can release the igniter as soon as it turned on. Because the delay circuit extends the igniter's igniting time and opening time of solenoid valve, the user is not required to wait for a little while holding the igniter knob.

DETAILED DESCRIPTION OF THE
EMBODIMENTS OF THE INVENTION

The invention will be described with reference to the embodiments shown in the drawings. In the description, the term "delay circuit' may be used to refer to a circuit adapted to perform a timing function, and this circuit may also be referred to as a "latching circuit" as the timing function can be used to perform a latching function for a predetermined period.

Figure 1:
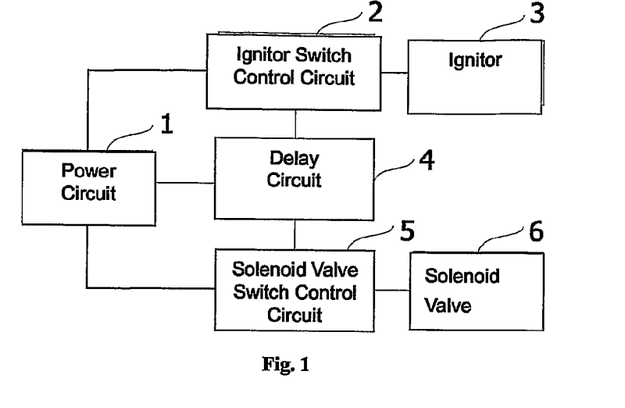
FIG. 1 is a schematic illustration of a first embodiment of an ignition system.

FIG. 1 is a schematic block diagram illustrating an embodiment of the inventive concept.

Figure 4:
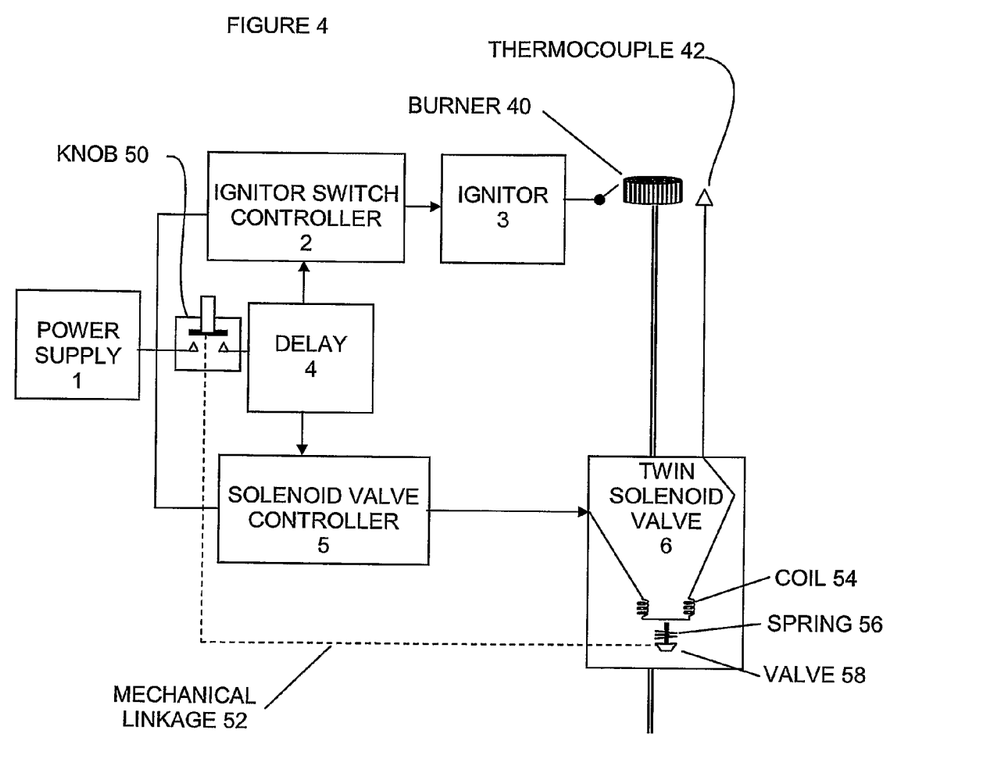
FIG. 4 illustrates an arrangement according to an embodiment of the invention.
Figure 5:
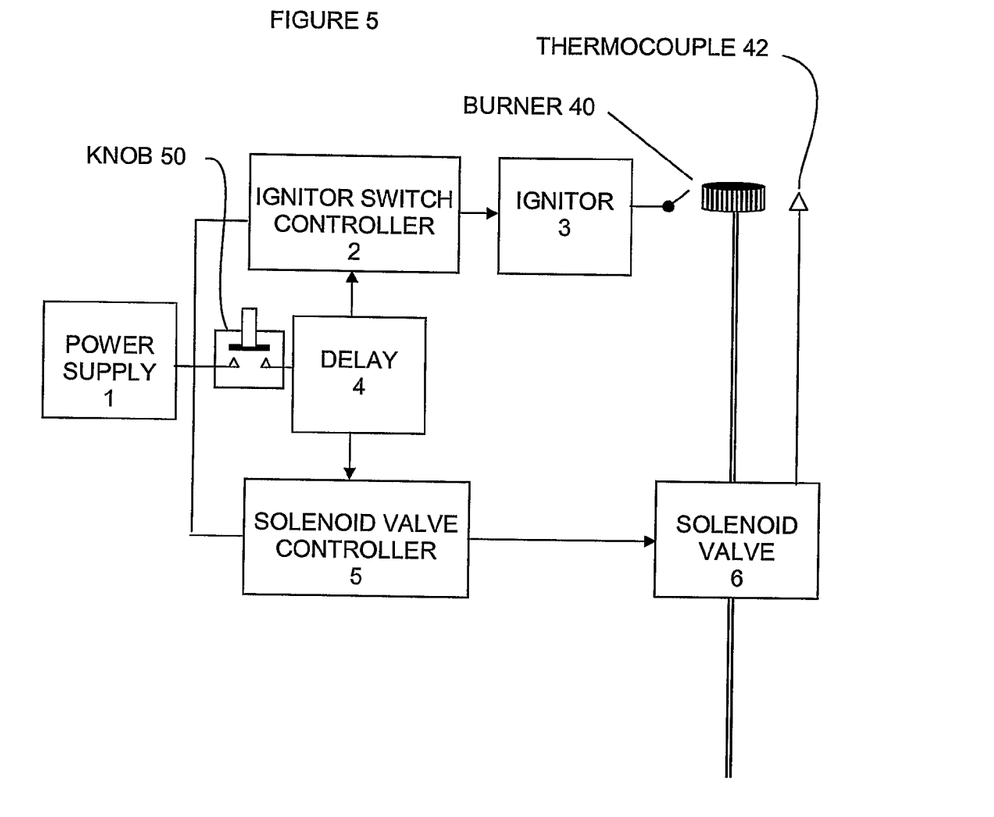
FIG. 5 illustrates an arrangement according to an alternative embodiment of the invention.

The first implementation mode of a cooker hob ignition system includes power circuit 1, igniter 3, solenoid valve 6, together with an igniter switch control circuit 2, a solenoid valve switch control circuit 5, as well as a time delay circuit 4. The power supply 1 provides power to the igniter 3. Igniter switch control circuit 2 is connected between the power circuit 1 and the igniter 3. Solenoid valve switch control circuit 5 is connected between power circuit 1 and the solenoid valve 6. The igniter switch control circuit 2 and the solenoid valve control circuit are both responsive to the delay circuit 4 to operate their corresponding devices. As best seen in FIGS. 4 and 5, a thermocouple can be used to operate the solenoid valve switch when the burner is in operation.

A cooker hob ignition system embodying this invention includes a control circuit of solenoid valve switch 5 which is connected between power circuit 1 and the solenoid valve 6, as well as delay circuit 4 which is connected between solenoid valve switch control circuit 5 and igniter switch control circuit 2. In this way, the user can release the igniting knob 50 (FIG. 4) as soon as it has been turned on without the necessity to hold the switch in the standby position for a period of time, as igniter switch control circuit 2 extends igniting time based on delay circuit 4.

Figure 2:
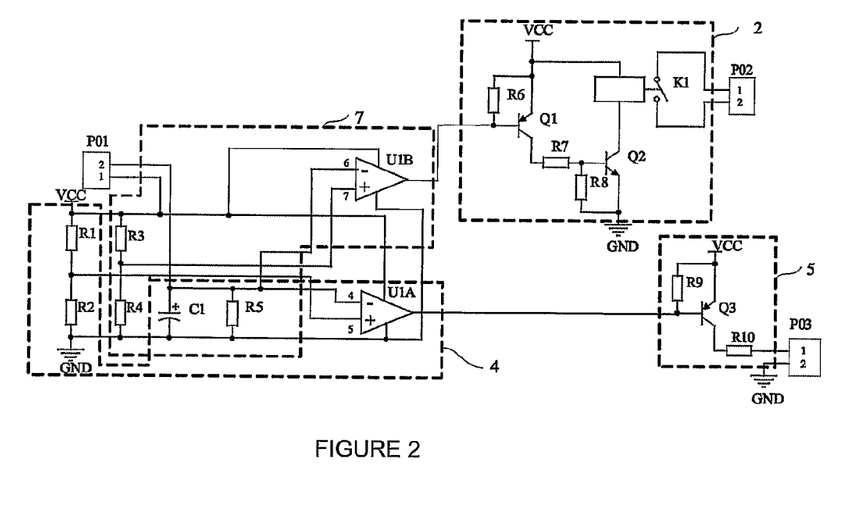
FIG. 2 is the detail electric circuit diagram of first implementation mode for the ignition system of FIG. 1.

FIG. 2 shows an electric circuit diagram of a first implementation for the ignition system of FIG. 1.

Solenoid valve switch control circuit 5 in FIG. 2 includes power circuit 1, transistor Q3 and divider resistance R10 both of which are serially connected between the power circuit 1 and the solenoid valve 6. The base and emitter of transistor Q3 are connected by resistance R9. The two terminals of solenoid valve are connected at P03.

The delay circuit 4 is connected between the solenoid valve 6 and power circuit 1. Delay circuit 4 includes a first capacitance C1 and discharging resistance R5 both of which are connected between the power circuit 1 and earth. The delay circuit 4 can provide comparatively stable voltage via comparator U1A.

The first comparator U1A is connected to the control circuit of solenoid valve switch 5. The negative pole of the first comparator U1A connects to the junction of capacitor C1 and resistor R5 of delay circuit 4, which form an RC timing circuit. The first capacitance C1 is an electrolytic capacitor. The positive pole of the first comparator U1A connects to solenoid valve reference voltage circuit 8. The first comparator U1A, delay circuit 4 and the solenoid valve reference voltage circuit 8 form a solenoid valve opening delay circuit.

Solenoid valve reference voltage circuit 8 includes resistance R1 and resistance R2 both of which are serial connected between working voltage and earth. Input terminal of negative pole of the first comparator U1A is connected between the resistance R1 and resistance R2. Because the solenoid valve reference voltage is fixed, the resistance R1 and resistance R2 select detailed resistance according a desired ratio, and to enable the first comparator U1A to provide solenoid valve reference voltage.

The second comparator U1B is connected between the delay circuit 4 and the control circuit of igniter switch 2. Input terminal of negative pole of the first comparator U1B connects to delay circuit 4 and connects to the first capacitance C1 and discharging resistance R5. The input terminal of positive pole of the second comparator U1B connects into igniter reference voltage circuit 7. The second comparator U1B, the delay circuit 4 and the igniter reference voltage circuit 7 together form an ignition delay circuit.

The igniter reference voltage circuit 7 includes third resistor R3 and the fourth resistor R4 both of which are serial connected between working voltage and earth. Positive input terminal of the comparator U1B connects between the third resistance R3 and the forth resistance R4. Because the solenoid valve reference voltage has been fixed, the ratio that the third resistance R3 against resistance R4 has been fixed also. Resistance values of the third resistance R3 and the forth resistance R4 are selected according to the fixed ratio voltage of the second comparator U1B provides solenoid valve reference voltage.

The ignition system can set the solenoid valve opening time and the igniting time through two voltage dividers comprising first resistance R1 and the second resistance R2 as well as R3 and R4.

In this embodiment, solenoid valve opening time can be set to 5 seconds and igniting time to 3 seconds through adjusting the resistances of R1, R2 and R2, R4. Of course, other settings of solenoid valve opening and igniting according to real requirements can readily be provided by selection of the resistor values.

The control circuit of igniter switch 2 is illustrated as relay K1 which is serial connected between the igniter 3 and the power circuit 1, as well as two transistors Q1 and Q2 connected to operate relay K1. The control circuit of igniter switch 2 is illustrated by the sixth resistance R6, the seventh resistance R7, the eighth resistance R8, the first transistor Q1, the second transistor Q2 and relay K1 connected to control interface of igniter 3 through P02.

A micro switch at P01 between the power circuit 1 (FIG. 1) and the delay circuit 4 provides an ignition signal in response to the initiation event, i.e., operation of the gas control knob by the user.

The delay of the ignition system utilizes the slow discharge of the first capacitance C1. The first voltage comparator U1A or the second comparator U1B may perform output switching reversal when the voltage of the first capacitance C1 is less than a preset reference value. The first voltage comparator U1A or the second comparator U1B may switch from logic 0 to logic 1 when the voltage of the first capacitance C1 is less than preset reference value to realize the effect of delay switch.

Pressing a gas valve (not shown) switches on the micro switch connected to P01 and pushes the solenoid valve 6 open. The microswitch at P01 closes to fully charge the first capacitance C1.

As soon as the first capacitance C1 is fully charged, its positive electrode is equal to high level VCC, and the negative electrode of the first voltage comparator U1A is equal to VCC while its positive electrode is equal to $[R2/(R1+R2)]*VCC$. Thus the negative terminal of U1A is higher than the voltage on positive terminal, and the first voltage comparator U1A produces a low voltage output, and the third transistor Q3 turns on, supplying power to solenoid valve 6 in order to keep it open.

The second voltage comparator U1B is similar to that of the first voltage comparator U01A. As soon as the first capacitance C1 is fully charged, its positive electrode is equal to high level VCC, its negative electrode is equal to $[R4/(R3+R4)]*VCC$, and the negative terminal voltage is higher than the positive terminal one, the second voltage comparator U1B delivers a low output voltage, and the first transistor Q1 and the second transistor Q2 turn on in order to keep relay K1 operated and igniter 3 begins to ignite continuously.

As soon as the user releases the gas, the micro-switch at P01 opens, the first capacitance C1 slowly discharges through release resistance R5 and its positive electrode voltage Vc01 slowly decreases. R5 determines the discharge rate of C1 because the operational amplifiers of comparators U1A and U1B have high input impedances.

When $Vc01>[R2/(R1+R0)]*VCC$, the first voltage comparator U01A outputs low level all the times and solenoid valve 6 continuously operates.

When $Vc01<[R2/(R1+R2)]*VCC$, the first voltage comparator U1A output switches to produce a high level output voltage, resulting in the third transistor Q3 turning off and stopping the supply of power to the solenoid valve 6. When the temperature of thermocouple 42 in FIG. 4 is high enough, the current generated from thermoelectric force can maintain solenoid valve 6 open continuously.

When $Vc01>[R4/(R3+R4)]*VCC$, the second voltage comparator U1B continuously outputs a low level, and igniter 3 continuously ignites.

When $Vc01<[R4/(R3+R4)]*VCC$, the second voltage comparator U1B output switches to a high level resulting in the first transistor Q1 and the second transistor Q2 turning off, P02 break off, igniter 3 stops igniting.

Power supply VCC of may be 5V, 3V or 1.5V, either transformed from commercial power 220V or obtained through battery boosting.

The igniter 3 may be adapted to use different power supplies from, e.g., 1.5V or 220V, and correspondingly adapted different igniter switch control circuit 2 may be used.

Figure 3:
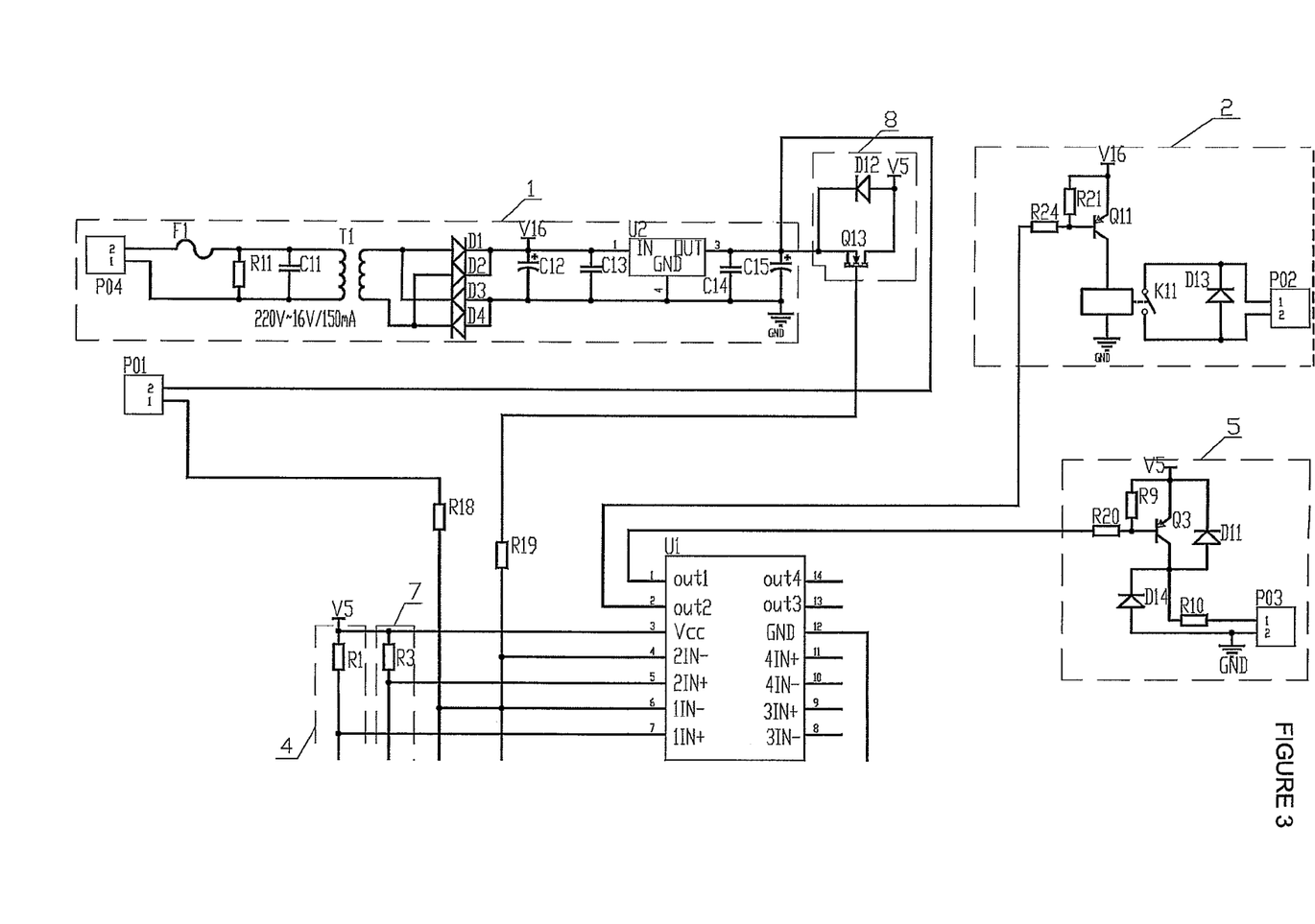
FIG. 3 is a circuit diagram of a second embodiment of the ignition system.

FIG. 3 is the detail electric circuit diagram of second implementation for a gas-oven ignition system according to an embodiment of the invention.

FIG. 3 includes a power circuit 1 and automatic protection feedback circuit 8.

The first comparator U1A and the second comparator U1B of FIG. 2 are replaced by the first controller U1.

Power circuit 1, which may be a universal circuit, could supply operational power for the whole system.

The automatic feedback circuit 8, connected with the power circuit 1 in serial, is used for protection for the power circuit 1. The automatic feedback circuit 8 may includes diode D12 and MOS transistor Q13 which connected in parallel.

The igniter switch control circuit 2 connects to the second output terminal (out2) of the first controller. The igniter switch control circuit 2 is completed by serial connecting with the eleventh transistor Q11 and relay K11 with each other. At the two terminals of the relay K11, the thirteenth diode D13 is connected in parallel. The $21^{st}$ resistance R21 is connected in between base and emitter of the 11th transistor Q11 while the 24th resistance R24 connects between the second output terminal of the first controller U1 and the base of Q11. The igniter switch control circuit 2 includes a relay drive circuit which is connected to control interface of igniter 3 through P02.

The delay circuit 4, which is connected between the solenoid valve 6 and the power circuit 1, may include the first capacitance C1 and resistance R5 connected between the power circuit 1 and ground. The delay circuit 4, the same as the first implementation mode, is used for supplying comparison voltage.

Positive electrode 1IN+ and negative electrode 1IN− of the first controller U1 respectively connect to the solenoid valve reference voltage circuit 8 and the delay circuit 4. The first output terminal OUT1 of the first controller U1 is connected to magnetic switch control circuit 5, and solenoid valve open delay circuit includes the first controller U1, the delay circuit 4 and the solenoid valve reference voltage 8.

Positive electrode 2IN+ and negative electrode 2IN− of the first controller U1 respectively connects to the igniter switch reference voltage circuit 7 and the delay circuit 4. The second output terminal OUT2 of the first controller U1 connects to igniter switch control circuit 2. Ignition delay circuit is composed of the first controller U1, the delay circuit 4 and the igniter switch control circuit 2.

The delay of the cooker hob ignition system utilizes the slow discharge of the first capacitance C1. The first controller U1 may perform output switching activity when voltage of the first capacitance C1 is less than preset reference value. The first controller U1 switches from Logic 0 to Logic 1 when voltage of the first capacitance C1 is less than preset reference value, to produce the effect of a delay switch.

The specific working process of the second implementation mode of the cooker hob ignition system in this invention is detailed as follows.

Pressing valve means (not shown in drawing) simultaneously switches on the micro switch connecting with P01 and turns on the solenoid valve 6 so that P01 closes to fully charge the first capacitance C1 via R18.

As soon as the first capacitance C1 is fully charged, its positive electrode is approximately equal to high level VCC, and the voltage of negative electrode 1IN− of the first controller U1 is equal to VCC. Positive electrode 1IN+ of the first controller U1 is equal to [R2/(R1+R2)]*VCC. The voltage of the first capacitance C1 is higher than the positive electrode 1IN+, the first output terminal OUT1 of the first controller U1 outputs low level, the third transistor Q3 turns on, then the circuit is continuously supplying power to solenoid valve 6 in order to keep it operating.

The operation of the second input of the first controller U1 is the same as the first input terminal. As soon as the first capacitance C1 is fully charged, its positive electrode is equal to high level VCC, its negative electrode is equal to [R4/(R3+R4)]*VCC, negative electrode voltage is higher than the positive electrode, the second output terminal OUT2 of the first controller U1 outputs low level, the 11th transistor Q11 turns on in order to keep relay K11 operated and igniter 3 begins to ignite continuously.

As soon the operating knob is released, P01 immediately breaks off, and the first capacitance C1 slowly discharges through resistance R5 and its positive electrode voltage Vc01 slowly decreases.

When Vc01>[R02/(R01+R02)]*VCC, the first output terminal OUT1 of the first controller outputs low level and solenoid valve 6 continuously operates. When Vc01<R02/(R01+R02)XVCC, the first output terminal OUT1 of the first controller U1's output switching reversal is in high level resulting in the third transistor Q3 switching off and the circuit stops supplying power to solenoid valve 6. When the temperature of thermocouple 42 in FIG. 4 is high enough, the current generated from the thermoelectric force can maintain solenoid valve 6 operate continuously.

Also, when Vc01>[R04/(R03+R04)]*VCC, the second output terminal OUT2 of the first controller U1 continuously outputs low level, and igniter 3 continuously ignites. When Vc01<[R04/(R03+R04)]*VCC, the second output terminal OUT2 of the first controller U1's output switching reversal is in high level resulting in the $11^{th}$ transistor Q11 is stopped, P02 is disconnected and igniter 3 stops igniting.

Implementation of the ignition system in the embodiments of this invention includes a timed latch which can be used to maintain the gas valve open during a first initiation period. Further embodiments include the maintenance of an auto-igniting function during a second initiation period. The control circuit detailed above is cost-effective, and its delay time can be adjusted as desired. Power circuit 1 may use battery for the power-supply because power consumption of the entire the ignition system is very low in the embodiments described.

The ignition system may apply to single or multi-burner stoves. It has great expandability, and it may expand with few components when applied to multi-stove terminal.

The invention also provides for a cooker hob. As shown in FIG. 1 and FIG. 2. This cooker hob is composed of ignition system which is includes power circuit 1, igniter 3 and magnetic 6 connected to the power circuit 1, igniter switch control circuit 2 connected in serial between the power circuit 1 and the igniter 3, solenoid valve switch control circuit 5 connected in serial between the power circuit 1 and the magnetic 6 and delay circuit 4 connected between the solenoid valve switch control circuit 5 and the igniter switch control circuit 2.

In the embodiment of FIG. 4, a thermocouple 42 is shown proximate the burner 40. The thermocouple 42 is connected to drive the solenoid valve to maintain it open while the thermocouple is heated by the combustion of gas from the burner. Current limiting devices, such as diodes 44, 46 or resistor 48 can be provided to limit current circulation between the thermocouple and the power supply during the ignition phase.

In the embodiment shown in FIG. 5, the thermocouple is connected to the solenoid valve controller, so that the power for the solenoid valve is provided from the power supply 1 in response to the output of the thermocouple.

Figure 6:
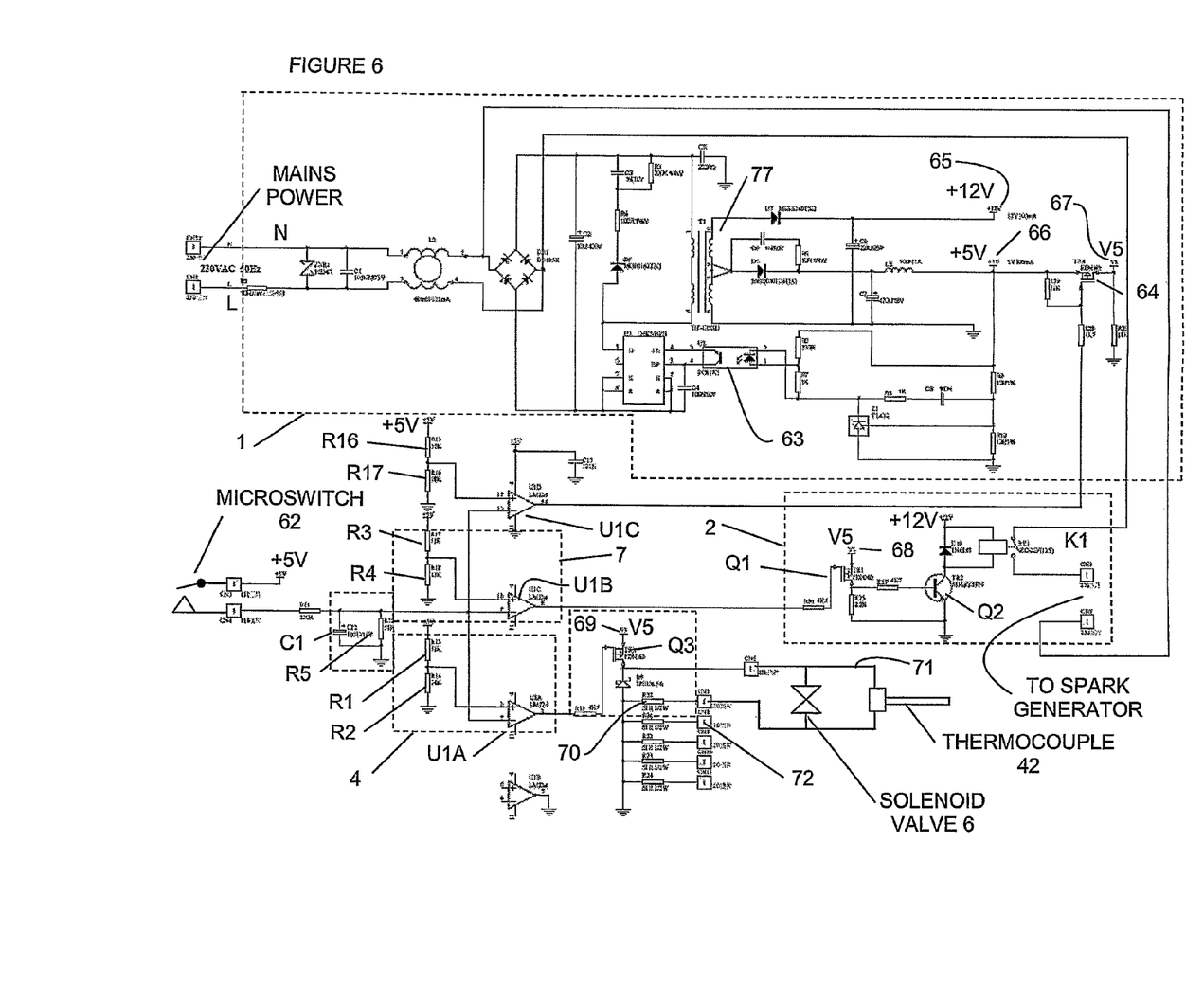
FIG. 6 shows a circuit according to an embodiment of the invention.

FIG. 6 illustrates a circuit according to a further embodiment of the invention.

The power supply 1 is capable of delivering three voltages, 12v at rail 65, 5v at rail 66, and V5 at rail 67. The 12v and 5v supplies are derived from the secondary winding of transformer 77. The supply to rail 67 from 5v rail 66 can be switched on or off via switch 64.

Switch 64 is controlled by comparator U1C which has its positive input connected to the junction of resistive divider formed by R16 and R17. The negative input of U1C is connected to the tinier voltage from the decay of C1 via R5. Thus the time at which U1C switches is controlled by the same time delay means as the time for the solenoid valve switch and the spark generator. The control switch Q3 which controls the solenoid valve 6 is derived from the V5 rail 67. Thus, the V5 supply to the solenoid valve 6 can be cut off after a time period determined by R16 and R17. This provides a feedback protection mechanism in case of a hardware failure, such as failure of the switch Q3 or the microswitch 62 which could otherwise result in the solenoid switch continually providing power to the solenoid valve and overriding the thermocouple safety arrangement.

Similarly, rail 68 is connected to the switchable V5 rail which can be disconnected via comparator U1C and switch 64.

Additional solenoid valves and thermocouples can be connected between rail 71 and the contact pads below R70. Resistor 70, and the corresponding resistors below it, serve to prevent cross-operation of the thermocouples keeping solenoid valves other than their associated valve open.

In this specification, reference to a document, disclosure, or other publication or use is not an admission that the document, disclosure, publication or use forms part of the common general knowledge of the skilled worker in the field of this invention at the priority date of this specification, unless otherwise stated.

Where ever it is used, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

It will be understood that the invention disclosed and defined herein extends to all alternative combinations of two or more of the individual features mentioned or evident from the text. All of these different combinations constitute various alternative aspects of the invention.

While particular embodiments of this invention have been described, it will be evident to those skilled in the art that the present invention may be embodied in other specific forms without departing from the essential characteristics thereof. The present embodiments and examples are therefore to be considered in all respects as illustrative and not restrictive, and all modifications which would be obvious to those skilled in the art are therefore intended to be embraced therein.

The invention claimed is:

1. A gas ignition system including a gas burner 40; a gas control system 4, 5, including a controllable valve arrangement 5, 6 responsive to an initiation event to deliver gas to the gas burner 40 and control means 4 responsive to the initiation event to provide a first control signal to the controllable valve arrangement 5, 6 to maintain the controllable valve arrangement 5, 6 open for a first predetermined time period after the initiation event; an ignition source 3; an ignition source controller 2 responsive to the initiation event to cause the ignition source 3 to ignite the gas delivered to the gas burner 40; and a thermocouple 42 proximate to the gas burner 40 and connected to the controllable valve arrangement 5, 6 to maintain the controllable valve arrangement 5, 6 open while the thermocouple 42 reaches operating temperature; wherein the ignition source 3 is responsive to a second control signal of the ignition source controller 2 to maintain ignition operation for a second predetermined time period different from the first predetermined time period.

2. A gas ignition system as claimed in claim 1, wherein the thermocouple 42 operates as a combustion detector to detect combustion of the gas at the burner.

3. A gas ignition system as claimed in claim 2, wherein the controllable valve arrangement 5, 6 is responsive to a combustion detection signal to maintain delivery of the gas to the burner, and to shut off delivery of the gas in the absence of the combustion detection signal after the first predetermined time period.

4. A gas ignition system as claimed in claim 1, including a power source to provide power to the gas ignition system.

5. A gas ignition system as claimed in claim 4, wherein the power source provides power to a delay circuit.

6. A gas ignition system as claimed in claim 4, wherein the power source provides power to the controllable valve arrangement 5, 6.

7. A gas ignition system as claimed in claim 1, wherein the controllable valve arrangement 5, 6 includes a solenoid valve and a power switch controlling delivery of power to the solenoid valve.

8. A gas burner ignition system, including a power circuit, an igniter, and a solenoid valve; characterized in a delay circuit (4) comprising a first capacitance and a second resistance connected in parallel between the power circuit and earth, a first comparator having a first input terminal connected to the delay circuit (4) and a second input terminal connected to a valve reference voltage circuit, wherein a solenoid valve opening delay circuit is being controlled by a valve control output of the first comparator, an igniter switch control circuit (21) connected between the power circuit and the igniter, a solenoid valve switch control circuit (5) having a first transistor and a first resistance both serially connected between the power circuit W and the solenoid valve (6), the solenoid valve switch control circuit (5) and the igniter switch control circuit (2) being controlled by the delay circuit (4).

9. An ignition system as claimed in claim 8, characterized in that it includes a second comparator having a first input connected to delay circuit; and a second input terminal connected to an ignition reference voltage circuit; the solenoid valve opening delay circuit being controlled by the ignition control output of the second comparator.

10. An ignition system as claimed in claim 8, characterized in that the system includes a first controller and a solenoid valve reference voltage circuit; the positive and negative poles of the first input terminal of the first controller connect into the solenoid valve reference voltage circuit and the delay circuit respectively; the first output terminal of the first controller connects with the solenoid valve switch control circuit, the solenoid valve opening delay circuit including the first controller, the delay circuit and the solenoid valve reference voltage circuit.

11. An ignition control system as claimed in claim 10, characterized in that the system further includes an ignition reference voltage circuit; the positive and negative poles of a second input terminal of the first controller connect to the ignition reference voltage circuit, and the delay circuit respectively; and solenoid valve turn-on delay circuit includes the controller, the delay circuit and the solenoid valve reference voltage circuit.

12. An ignition system as claimed in claim 8, characterized by the igniter switch control circuit including a relay and a transistor serially connected between the power circuit and igniter.

13. An ignition system as claimed in claim 8, characterized in that the system further includes an automatic protection feedback circuit, which is connected to the power circuit; and a micro switch connected between the power circuit and the delay circuit.

14. An ignition system as claimed in claim 8, including a switchable power supply, and timer means adapted to switch off power to the solenoid valve after a third predetermined time.

15. A system as claimed in claim 8 including: a switch (Q3); control means (4) responsive to the initiation event to provide a first control signal to the switch (Q3) to connect the controllable valve arrangement (5, 6) to the power source for a first predetermined time period after the initiation event.

16. A method of controlling a gas burner having a solenoid controlled gas delivery valve arrangement including a gas valve controller and a gas valve, and an igniter adapted to ignite the gas from the gas burner, the method being characterized by the steps of providing an initiation event to deliver gas to the gas burner; providing an initiation signal in response to the initiation event; initiating a timing process in response to the initiation signal; opening the gas valve in response to the initiation signal; maintaining the gas valve open for a first time period after the initiation event, wherein the first time period is determined by applying an output of the timing process to the gas valve controller; initiating an igniter in response to the initiation signal; and maintaining the igniter operation for a second period of time determined by the timing process.

17. A method as claimed in claim 16, characterized in that the method includes the steps of producing a combustion detection signal; and supplying power to the solenoid valve in response to the combustion detection signal.

18. A method as claimed in claim 16, wherein the initiation event includes operation of an igniter knob and characterized in that the method includes the step of maintaining the gas valve open after a release of the igniter knob.

* * * * *